(12) United States Patent
Petiton et al.

(10) Patent No.: US 10,471,762 B2
(45) Date of Patent: Nov. 12, 2019

(54) SECURED PRODUCT WITH IMPROVED READABILITY AND METHOD OF PRODUCING SAID SECURED PRODUCT

(75) Inventors: Valéry Petiton, Vendrest (FR); Françoise Daniel, Champs sur Marne (FR)

(73) Assignee: SURYS, Bussy-Saint-Georges (FR)

( * ) Notice: Subject to any disclaimer, the term of this patent is extended or adjusted under 35 U.S.C. 154(b) by 559 days.

(21) Appl. No.: 13/992,495

(22) PCT Filed: Dec. 6, 2011

(86) PCT No.: PCT/EP2011/071963
§ 371 (c)(1),
(2), (4) Date: Jun. 7, 2013

(87) PCT Pub. No.: WO2012/076547
PCT Pub. Date: Jun. 14, 2012

(65) Prior Publication Data
US 2013/0252008 A1    Sep. 26, 2013

(30) Foreign Application Priority Data
Dec. 7, 2010  (FR) ..................... 10 60190

(51) Int. Cl.
*B42D 25/47* (2014.01)
*B32B 29/00* (2006.01)
(Continued)

(52) U.S. Cl.
CPC .............. *B42D 25/47* (2014.10); *B32B 7/02* (2013.01); *B32B 29/00* (2013.01); *B42D 25/00* (2014.10);
(Continued)

(58) Field of Classification Search
CPC ...... B42D 15/10; B42D 25/00; B42D 25/328; B42D 2033/04; B42D 2033/18;
(Continued)

(56) References Cited

U.S. PATENT DOCUMENTS 6,491,324 B1 * 12/2002 Schmitz ............... B42D 25/355
283/72
2004/0121257 A1 * 6/2004 Kaminsky ................ B41M 3/14
430/201
(Continued)

FOREIGN PATENT DOCUMENTS

CH      680 170 A5    6/1992
CN      1976815 A     6/2007
(Continued)

OTHER PUBLICATIONS

Office Action in corresponding Chinese Patent Application No. 201180064086.9 dated Aug. 27, 2014 (7 pages).
(Continued)

*Primary Examiner* — Justin V Lewis
(74) *Attorney, Agent, or Firm* — Osha Liang LLP

(57) ABSTRACT

A secure product, and a production method, comprising a first reflective layer, a second layer and a third layer including readable information, the first layer being enclosed between the second and the third layers, in which the first and second layers are transparent, at least a first part of the internal surface of the second layer comprises a diffusing microstructure, and the diffusing microstructure is positioned so as to cover a predetermined part of the readable information.

8 Claims, 2 Drawing Sheets

(51) Int. Cl.
  *B32B 7/02* (2019.01)
  *B42D 25/00* (2014.01)
  *B42D 25/328* (2014.01)

(52) U.S. Cl.
  CPC ....... *B32B 2264/10* (2013.01); *B32B 2307/40* (2013.01); *B32B 2425/00* (2013.01); *B42D 25/328* (2014.10); *B42D 2033/04* (2013.01); *B42D 2033/18* (2013.01); *B42D 2035/34* (2013.01); *Y10T 428/31993* (2015.04)

(58) Field of Classification Search
  CPC ....... B42D 2035/34; B32B 29/00; B32B 7/02; B32B 2264/10; B32B 2425/00; B32B 2307/40; Y10T 428/31993
  See application file for complete search history.

(56) References Cited

U.S. PATENT DOCUMENTS

| | | |
|---|---|---|
| 2005/0269818 A1 | 12/2005 | Forde |
| 2007/0195387 A1 | 8/2007 | Weyermann et al. |
| 2008/0224462 A1* | 9/2008 | Dubner ................ B32B 27/36 283/75 |
| 2009/0316261 A1 | 12/2009 | Garcia-Leiner et al. |
| 2009/0322071 A1* | 12/2009 | Dichtl ................ D21H 21/42 283/70 |
| 2010/0045024 A1* | 2/2010 | Attner .................... B32B 29/06 283/72 |
| 2010/0308571 A1* | 12/2010 | Steenblik ............. G02B 3/0031 283/72 |

FOREIGN PATENT DOCUMENTS

| | | |
|---|---|---|
| CN | 101373221 A | 2/2009 |
| CN | 101610907 A | 12/2009 |
| CN | 101646557 A | 2/2010 |
| EP | 1 897 700 A2 | 3/2008 |
| WO | 02/084343 A1 | 10/2002 |
| WO | 2006/007742 A1 | 1/2006 |
| WO | 2008097733 A2 | 8/2008 |

OTHER PUBLICATIONS

International Search Report issued in PCT/EP2011/071963 dated Feb. 20, 2012 (6 pages).
Written Opinion of the International Searching Authority issued in PCT/EP2011/071963 dated Feb. 20, 2012 (6 pages).
Office Action issued in corresponding Chinese Application No. 201180064086.9, dated Nov. 27, 2015 (20 pages).
Office Action issued in corresponding Chinese Application No. 201180064086.9, dated Jun. 15, 2016 (17 pages).
Office Action issued in corresponding Chinese Application No. 201180064086.9, dated May 11, 2015 (19 pages).

* cited by examiner

SECURED PRODUCT WITH IMPROVED READABILITY AND METHOD OF PRODUCING SAID SECURED PRODUCT

DOMAIN OF THE INVENTION

The invention relates to secure products and their production methods, such as, for example, security documents comprising a plurality of layers.

DESCRIPTION OF THE PRIOR ART

To provide protection against counterfeits or forgeries of secure products, for example security documents, and in order to increase the level of security of these products, it is known for specific security elements to be incorporated into said products.

In the case of security documents, international standards, such as the ISO7810 standard, define formats to be complied with. Mention will be given notably to ISO7810 ID-1 for identity or bank cards, and ISO7810 ID-3 for passports.

Generally, these security documents are made in two phases: first of all, variable data, such as the personal data of the bearer, are printed on the carrier of the security document, generally comprising paper, then these data are protected and secured by the transfer of different protective layers. The association of the protective layers and the carrier of the secure product is made according to the prior art by thermal lamination or hot pressing of the secure product so as to thermally bond the protective layers onto the carrier of the secure product using, for example, a heat-reactivatable adhesive.

These variable data may include information intended to be read, or readable information, which generally appears as text in a visual inspection zone and in a machine-readable zone. This machine-readable zone (MRZ) is defined by the ICAO 9303 standard and is devoted to the optical reading of data by machines which begin by acquiring an image of the MRZ of a security document, then analyze the data inscribed on the MRZ. Readers have been developed for this purpose and are used notably at border posts.

In said secure products, the security elements currently used are optical security elements. The optical security elements are generally optically variable elements such as diffractive structures including holograms. These optically variable elements generally occur in the form of laminates which comprise a reflective and at least partially transparent layer and a layer comprising a diffractive microstructure, and which are deposited so as to cover the variable data contained in products to be secured in order to protect these products notably against forgery of their data. The strong bond between the laminate and the carrier prevents the detachment of the security laminate so as to prevent the laminate from being reused on a forged document or the details inscribed under the security laminate from being modified. These laminates have a dual function, that of protecting the security document against dirt and scratches, and that of protecting the security document against forgery.

The optical security elements must be sufficiently complex to prevent a forger from reproducing or simulating the optical security element. For the optical security to be effective, the secure products according to the prior art were designed by seeking to achieve, on the one hand, the complexity and originality of the microstructures, and, on the other hand, to ensure that the optical effect was the most intense possible.

However, the reflective layer, which is necessary for the visibility of the optically variable elements and covers the entirety of the protected surface, acts as a reflector having a specular reflection which dazzles in direct reflection and substantially hinders the reading of the variable data either by a machine or by the naked eye of an operator. The more the laminate is effective in terms of protection of the security document, i.e. the more the laminate has a high power of reflection in the zones comprising optically variable elements, the more difficult the reading by the machine.

DESCRIPTION

An object of the present invention is to provide secure products, comprising at least one first reflective, transparent layer, a second transparent layer and a third layer including readable information, improving the optical reading of information contained in reading zones of these secure products and readable by machines or by the naked eye without reducing the resistance to counterfeiting and forgery of the secure products, and without increasing their cost. In this perspective, the Applicant has advantageously found that the addition of a diffusing microstructure onto at least a first part of the internal surface of the second layer of the secure product enables this object to be achieved.

In the present description and in the claims which follow, the words "readable information" are used with reference to information contained in the secure product intended to be read by the naked eye or by a machine in order to identify and/or authenticate the secure product. This readable information may be data appearing in the form of text containing, for example, the biographical data of the owner of the product, data appearing in the form of a symbol or number or any other form identifying and/or authenticating the secure product.

In the present description and in the claims which follow, the words "reading zone" are used with reference to a zone in which readable information contained in the secure product is located. Each reading zone is dedicated either to reading by the naked eye, or to reading by machine, or both reading by the naked eye and by machine.

In the present description and in the claims which follow, the word "reflective" is used with reference to the reflection of light at least partially in the visible range. Thus, for example, a reflective layer is a layer which can reflect light at least partially in the visible range.

In the present description and the claims which follow, the word "transparent" is used with reference to the at least partial passage of light in the visible range across a medium. Thus, for example, a transparent layer is a layer which can allow light in the visible range to pass at least partially.

In the present description and in the claims which follow, the words "internal surface" are used with reference to the surface of a layer or of another element of the secure product or of the multilayer product according to the invention which is in contact with another layer or another element of the product.

In the present description and in the claims which follow, the words "external surface" are used with reference to the surface of a layer or of another element of the secure product or of the multilayer product according to the invention which is not in contact with another layer or another element of the product.

According to a first aspect of the present invention, said object is achieved by means of a secure product comprising a first reflective layer, a second layer and a third layer including readable information, the first layer being enclosed between the second and third layers, in which the first and second layers are transparent, at least a first part of the internal surface of the second layer comprises a diffusing microstructure and the diffusing microstructure is positioned so as to cover a predetermined part of the readable information.

Adding a diffusing microstructure on a part of the internal surface of the second layer of the secure product improves the readability to the naked eye or by a machine of the readable information contained in the third layer of the secure product.

In an advantageous manner, readable information contained in a secure product, which may be located in one or more reading zones of the secure product, is readable by the naked eye or by a machine in an improved manner, by reducing notably the phenomenon of dazzle in direct reflection.

The diffusing microstructure is preferably positioned so as to cover the entirety of the readable information. In a preferred embodiment, the diffusing microstructure is positioned so as to cover the readable information contained in the machine-readable zone (MRZ) of the secure product.

In a preferred embodiment, the diffusing microstructure has a shape, size and/or positioning in the secure product such that, during use, it enables a further improved readability of the readable information contained in the secure product.

In a preferred embodiment, the surface of the diffusing microstructure covers 100% of the second layer. In a preferred embodiment, the surface of the diffusing microstructure is between 1 and 90%, preferably between 10 and 70% and more preferably between 15 to 20% of the total surface of the second layer.

In a preferred embodiment of the present invention, the diffusing microstructure comprises a microrelief. In a preferred embodiment, the diffusing microstructure comprises a plurality of peaks and/or valleys positioned in a random manner. In a preferred embodiment, the height of the peaks and the depth of the valleys are each appreciably less than 1 µm, preferably between 50 and 200 nm, and preferably between 100 and 160 nm Even more particularly, the height of the peaks and the depth of the valleys are around 130 nm. In a preferred embodiment, the height of the peaks and the depth of the valleys are again within these value ranges, but different from one another. The dispersive nature of the diffusing microstructure is dependent on the density and size of the peaks and valleys, which may be defined by the person skilled in the art according to the desired product.

In a preferred embodiment, the diffusing microstructure creates a refractive index gradient at the interface of the first and second layers. The modification of the topography of the surface of the second layer, due to the addition of a diffusing microstructure on the internal surface of said second layer, creates an anti-reflective surface by creating a refractive index gradient at the interface of the first and second layers. The refractive index gradient in the zones where a good quality of reading by the naked eye or by machines of the readable information are to be maintained is such that light is no longer reflected but dispersed in the underlying layers, then absorbed by the third layer.

According to a preferred embodiment, the specular reflection in the part of the second layer comprising the diffusing microstructure is reduced by between 20% and 80%, and preferably by 50% compared with the remainder of the second layer when the first part of the second layer comprising the diffusing microstructure does not cover the entirety of the internal surface of the second layer or compared with a layer identical to the second layer but not comprising the diffusing microstructure when the first part of the second layer comprising the diffusing microstructure covers the entirety of the internal surface of the second layer.

The specular reflection on the surface of the second layer of the secure product, i.e. the quantity of light for which an incident ray produces a single reflected ray, can be measured by any given suitable technique known to the person skilled in the art, and, for example, by a relative measurement acquired using a Novo-Curve glossmeter from Rhopoint Instruments. The device is positioned so as to transmit a ray of light at a predetermined angle onto a part of the secure product to be evaluated and to measure the quantity of the light reflected by the secure product. For example, for an angle of 60°, the specular reflection is less than 100.

In order to compare different parts of the secure product, the device is first positioned so as to transmit a ray of light at a predetermined angle onto a part of the secure product having a maximum reflective characteristic and to measure a first value Gloss1. The device is then positioned so as to transmit a ray of light at the same predetermined angle onto a second part of the secure product having a diffusing microstructure and to measure a second value Gloss2. The Gloss2/Gloss1 ratio allows the specular reflection difference between these two parts of the secure product to be evaluated. In a preferred embodiment, for a predetermined angle of 60°, the Gloss2/Gloss1 ratio determined in this way is less than 80% and preferably less than 50%.

In a preferred embodiment, the first part of the internal surface of the second layer comprises at least two diffusing microstructures, each having a different dispersive character. Advantageously, the presence of a plurality of diffusing microstructures having a different dispersive character allows a distinctive mark, such as a logo, detectable to the naked eye and/or to the machine, to be created on the surface of the secure product.

In one embodiment, the first part of the internal surface of the second layer comprises at least two diffusing microstructures, each having a different microrelief. According to one embodiment, the first part of the internal surface of the second layer comprises a first diffusing microstructure having a first microrelief and a second diffusing microstructure having a second microrelief, the second microrelief being different from the first microrelief.

According to one embodiment, the first part of the internal surface of the second layer comprises a first diffusing microstructure having a first dispersive character and a second diffusing microstructure having a second dispersive character, the second dispersive character being different by 10 to 60% compared with the first dispersive character, preferably by 30 to 50%, compared with the first dispersive character.

In order to compare these two diffusing microstructures, the Novo-Curve glossmeter from Rhopoint Instruments, having measured the value Gloss2 with reference to a first diffusing microstructure as defined above, is further positioned so as to transmit a ray of light at the same predetermined angle onto a part of the secure product comprising a second diffusing microstructure, this second diffusing microstructure having a different dispersive character compared with the first diffusing microstructure, and to measure a third value Gloss3. The Gloss2/Gloss3 ratio allows the specular reflection difference between the two diffusing microstructures to be evaluated. In a preferred embodiment, where the second diffusing microstructure has a dispersive character less than that of the first diffusing microstructure, for a predetermined angle of 60°, the Gloss2/Gloss3 ratio determined in this way is between 10 and 50%, preferably between 10 and 30%, and is preferably 15%.

In a preferred embodiment, the first layer has a mean thickness of between 5 and 500 nm, preferably between 5 and 250 nm, and preferably between 10 and 50 nm. In a preferred embodiment, the second layer has a mean thickness less than or equal to 10 µm, and preferably between 2 and 10 µm. In a preferred embodiment, the third layer has a mean thickness of between 50 and 500 µm, and preferably between 80 and 120 µm.

According to a preferred embodiment, the first layer comprises at least one component having a high refractive index, for example higher than 2. In a preferred embodiment, the first layer comprises at least one component chosen from zinc sulfide, titanium dioxide or zirconium oxide.

According to a preferred embodiment, the second layer comprises a thermoformable varnish. In another preferred embodiment, the second layer comprises at least one acrylic varnish.

In a preferred embodiment, the third layer of the secure product comprises at least one component chosen from polycarbonate, Plexiglas, polyethylene, polypropylene, polyethylene terephthalate, polyvinyl chloride, polyester, paper or mixtures of these. In a preferred embodiment, the third layer of the secure product comprises paper.

In a preferred embodiment, the secure product may further comprise an adhesive layer between the first and third layers.

The adhesive layer enables the first and third layers to be bonded to one another. In a preferred embodiment, the adhesive layer comprises a thermoreactivatable adhesive. In a preferred embodiment, the adhesive layer comprises polymers having a melting point between 80° C. and 150° C., preferably an acrylic polyurethane copolymer based adhesive in aqueous dispersion. In a preferred embodiment, the adhesive layer has a thickness of between 2 and 25 µm, preferably between 5 and 10 µm.

According to a preferred embodiment, the adhesive layer comprises a thermoreactivatable material.

In another preferred embodiment, the secure product may further comprise a protective layer on the external surface of the second layer.

The protective layer allows the secure product to be protected against at least one of dirt, scratches, chemical attacks and forgery. In a preferred embodiment, the protective layer comprises an acrylic varnish. In a preferred embodiment, the protective layer comprises at least one of polyvinylidene chloride, polyvinylidene fluoride or an acrylic or vinyl copolymer. In a preferred embodiment, the protective layer has a thickness of between 1 and 10 µm, preferably between 1.5 and 5 µm, and preferably between 1.5 and 2 µm.

In a preferred embodiment, a second part of the internal surface of the second layer comprises at least one diffractive microstructure. According to a particular embodiment, the specular reflection in the first part of the second layer comprising the diffusing microstructure is reduced by between 20 and 90%, preferably between 40 and 60%, preferably between 45 and 55%, and preferably by 50% compared with the part of the second layer comprising the diffractive microstructure.

In a preferred embodiment, the diffractive microstructure comprises a microrelief. In a preferred embodiment, the diffractive microstructure comprises a plurality of peaks and/or valleys positioned in an at least partially regular manner. In a preferred embodiment, the height of the peaks and the depths of the valleys are approximately of the same order of magnitude as the height of the peaks and depths of the valleys of the diffusing microstructure, and are preferably within the value ranges given with reference to the diffusing microstructure.

In a preferred embodiment, the first and second layers cover the entirety of the third layer. This ensures the security against forgery of the readable information contained in said secure product by enabling the first and second layers to protect all of the readable information contained in the secure product, but without preventing or reducing the readability of this readable information.

According to another aspect of the present invention, said object is achieved by means of a multilayer product intended for securing readable information which may advantageously be used as an intermediate product in the preparation of the secure product described above. As will be explained below, the object of improving the readability of the readable information is achieved thanks to the characteristics of the multilayer product intended to be integrated into the final product, i.e. into the secure product.

The multilayer product intended for securing readable information in fact comprises a first reflective layer, a carrier, and a second layer enclosed between the first layer and the carrier, wherein the first layer and the second layer are transparent and at least a first part of the surface of the second layer opposite the carrier comprises a diffusing microstructure.

In a preferred embodiment, the carrier is detachable from the second layer. In this way, the final secure product obtained on the basis of the multilayer product with its carrier removed is as defined in the independent claim of the secure product.

In a preferred embodiment, the carrier comprises a substrate and a detachment layer on the internal surface of the substrate. In one embodiment, the substrate is a polyester film, preferably with a mean thickness of between 10 and 50 µm and preferably between 15 and 20 µm. In a preferred embodiment, the detachment layer is a layer of natural or synthetic wax, preferably with a mean thickness of less than 1 µm.

In a preferred embodiment, a second part of the surface of the second layer opposite the carrier comprises at least one diffractive microstructure.

In a preferred embodiment, the multilayer product further comprises a protective layer between the second layer and the detachment layer of the carrier.

In a preferred embodiment, the multilayer product further comprises an adhesive layer on the external surface of the first layer.

In a preferred embodiment, the first layer comprises at least one component chosen from zinc sulfide, titanium dioxide, or zirconium oxide.

Another aspect of the invention relates to a method for producing a secure product comprising a first transparent and reflective layer, a second transparent layer and a third layer including readable information, the method comprising the provision of a multilayer product as described above, the bonding of the third layer onto the multilayer product, and the detachment of the carrier following said bonding.

The method for producing the secure product according to the invention comprises preferred steps which are carried out to obtain a secure product according to one or more preferred embodiments described above.

The bonding of the multilayer product and the third layer to one another may be carried out using any given suitable technique known to the person skilled in the art. In a preferred embodiment, the bonsding is carried out using an adhesive. In another embodiment, the bonding is a thermal bonding. According to a preferred embodiment, the thermal bonding comprises a pressing of the layers and a thermal bonding.

Another aspect of the present invention relates to a method for producing a multilayer product intended for securing readable information comprising a carrier, a first reflective and transparent layer and a second transparent layer enclosed between the first layer and the carrier, the method comprising the deposition of the second layer onto the carrier, the formation of a diffusing microstructure on at least a first part of the surface of the second layer opposite the carrier and the deposition of the first layer onto the second layer thus provided with the diffusing microstructure.

The diffusing microstructure can be formed on the second layer using any given suitable technique known to the person skilled in the art.

In a preferred embodiment, the diffusing microstructure is generated by a plurality of coherent light sources and is recorded during the recording of an optical matrix. The optical matrix is then converted by galvanoplasty into a metal matrix used during the formation of the microstructure on the second layer.

In a particular embodiment, the formation of the diffusing microstructure is carried out by stamping of the second layer. In a preferred embodiment, the stamping is carried out so as to form a microrelief on the internal surface of the second layer. In the present application, the word "stamping" is used with reference to a forming method comprising hot-pressing a matrix onto the surface to be stamped.

In another preferred embodiment, the formation of the diffusing microstructure is carried out by molding of the second layer. In a preferred embodiment, the molding is carried out so as to form a microrelief on the internal surface of the second layer. In the present application, the word "molding" is used with reference to a forming method comprising the pressing of a matrix onto the surface to be molded followed by crosslinking of the surface which fixes the microstructure.

In a preferred embodiment, the carrier comprises a substrate and a detachment layer, the detachment layer being situated on the internal surface of the substrate.

In a preferred embodiment, the method further comprises the deposition of an adhesive layer onto the external surface of the first layer.

In a preferred embodiment, the method further comprises the deposition of a protective layer between the second layer and the carrier to protect the secure product against dirt and forgery.

The deposition of the first and second layers and of the adhesive and protective layers may be carried out using any given suitable technique known to the person skilled in the art. The choice of the technique used for the deposition of each of these layers depends on the composition of each of said layers. From the available techniques, the person skilled in the art will be able, for example, to choose a vapor-phase chemical deposition, a vapor-phase physical deposition, printing by photo-engraving or yet deposition by coating.

In a preferred embodiment, the method further comprises the formation of a diffractive microstructure on at least a second part of the internal surface of the second layer. This diffractive microstructure may be a hologram.

In a preferred embodiment, the height of the peaks and the depth of the valleys comprised in the diffusing microstructure and in the diffractive microstructure are approximately of the same order of magnitude. The diffusing microstructure and the diffractive microstructure may advantageously be recorded on a single optical matrix and may thus be formed simultaneously on the second layer. The simultaneous formation of the diffusing microstructure and of the diffractive microstructure solves the problem of positioning of the microstructures in relation to one another on the second layer.

In a preferred embodiment, the diffractive and diffusing microstructures are recorded successively on a single optical matrix. In a preferred embodiment, the formation of the diffusing microstructure and the formation of the diffractive microstructure are carried out simultaneously.

In a preferred embodiment, the matrix comprises a photosensitive material. In a preferred embodiment, the diffusing microstructure is generated by a plurality of coherent light sources. In a preferred embodiment, the diffractive microstructure is generated by a limited number of light sources, preferably 2. Once the two microstructures have been recorded, the optical matrix is converted by galvanoplasty into a metal matrix used during the formation of the microstructures on the second layer.

In a preferred embodiment, the methods as described above are carried out in a continuous manner, with no intermediate storage points between the different steps of the methods, for example by treating undefined lengths of raw materials, for example stored in reels.

The addition of a diffusing microstructure into the second layer of the secure product advantageously provides a secure product the readable information of which can be read correctly by the naked eye or by a machine.

BRIEF DESCRIPTION OF THE DRAWINGS

The invention will now be described with reference to the attached drawings in which the figures are not to scale and the dimensions of some elements are enlarged for illustrative purposes, and in which.

DETAILED DESCRIPTION OF PREFERRED EMBODIMENTS

Figure 1:
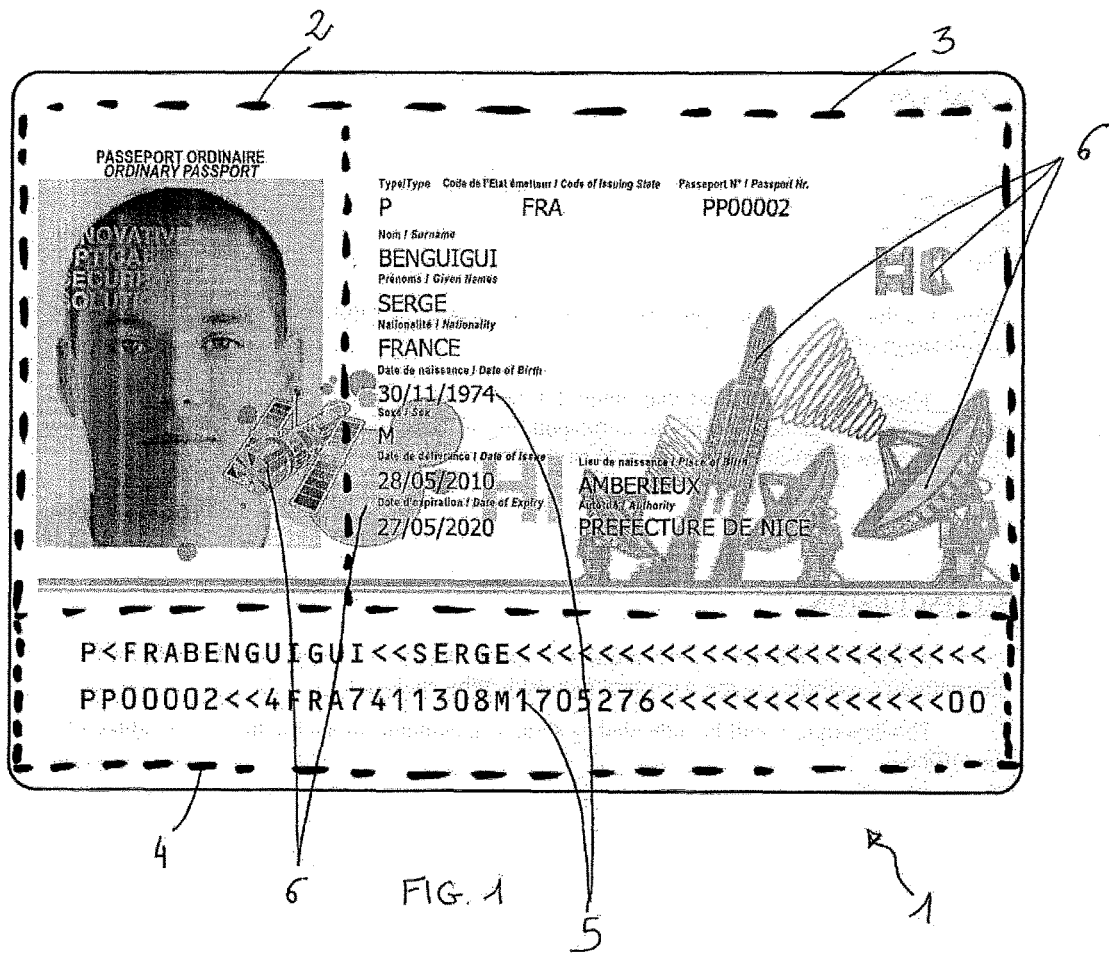
FIG. 1 shows a top view of a secure product according to one embodiment of the present invention.

FIG. 1 shows a secure product 1, for example a page of a passport, in a top view.

The secure product 1 comprises a zone for a photo 2, and two reading zones 3, 4. These reading zones are a first zone for reading with the naked eye 3 comprising readable information 5 such as bibliographical data of the owner of the secure product and a zone intended for reading by machine 4 comprising other readable information 5 such as the name of the owner and characters authenticating the secure product.

The secure product 1 further comprises security elements such as holograms 6 or printed marks and elements (not shown).

Figure 2:
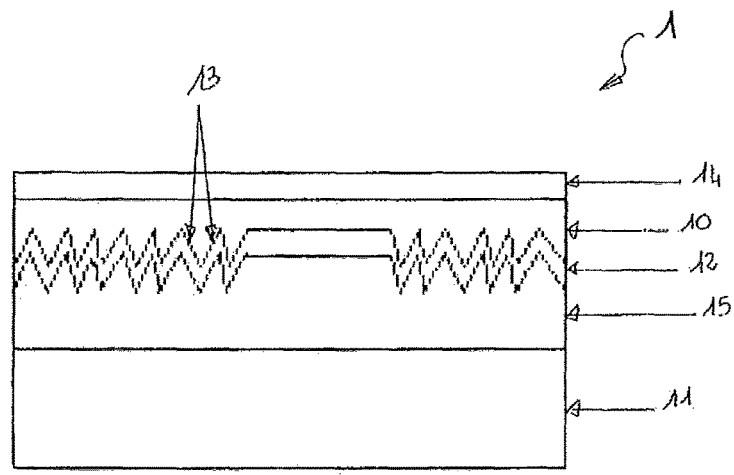
FIG. 2 shows a cross-section view of the secure product shown in FIG. 1.

FIG. 2 shows the secure product 1 in a cross-section view.

The secure product 1 comprises a first reflective and transparent layer 12, a second transparent layer 10 and a third layer 11 including readable information. The first layer 12 is enclosed between the second and third layers 10, 11.

The first layer 12 is made of zinc sulfide. The second layer 10 is a layer of acrylic varnish. The third layer 11 is paper. The mean thickness of the first layer 12 is between 20 and 140 nm. The second layer 10 has a mean thickness of between 1 and 25 µm. The third layer 11 has a mean thickness of 110 µm. The secure product 1 further comprises a diffusing microstructure 13 on the internal surface of the second layer 10. The microstructure 13 is positioned in order to cover the zone for reading by machine 4. The diffusing microstructure 13 comprises a plurality of peaks of different heights distributed in an irregular, stochastic manner. The roughness of the diffusing microstructure is 130±30 nm.

The secure product 1 further comprises a protective layer 14 and an adhesive layer 15. The protective layer 14 is positioned on the second layer 10. The adhesive layer is enclosed between the first and third layers 11, 12.

Figure 3:
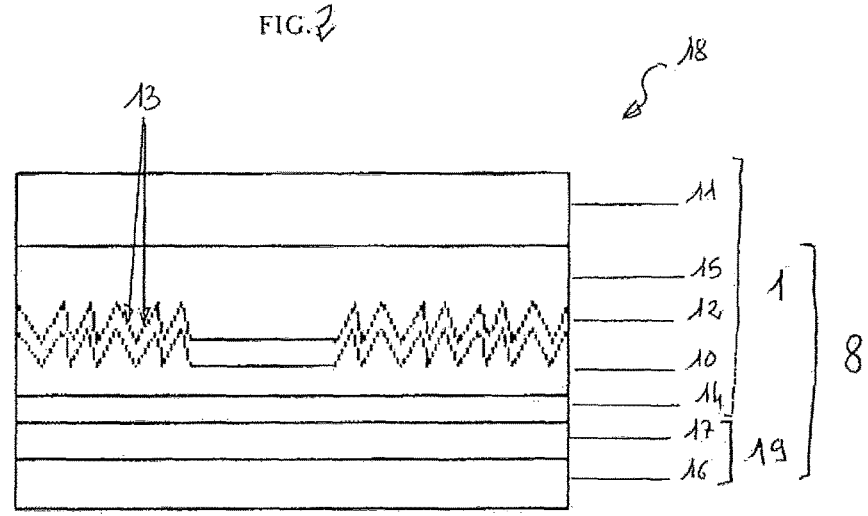
FIG. 3 shows a cross-section view of an intermediate product during a phase of the production of the secure product shown in FIG. 1.

The method for producing the secure product 1 is described with reference to FIG. 3. In this Figure, a carrier 19 is shown comprising a substrate 16 and a detachment layer 17 located on the internal surface of the substrate 16. The detachment layer 17 is deposited by coating onto the substrate 16. The protective layer 14 and the second layer 10 are then deposited by coating onto the detachment layer 17. The second layer 10 is stamped so as to form the microstructure 13 on a first part of its internal surface. The first layer 12 is deposited 10 by vacuum evaporation onto the second layer. The adhesive layer 15 is then deposited by coating onto the first layer 12. In this way, a multilayer product 8 is obtained.

At that level, the third layer 11 is bonded onto the adhesive layer 15. Finally, an intermediate product 18 is formed by bonding of the multilayer product 8 and the third layer 11. The first and third layers 11, 12 are bonded to one another by means of the adhesive layer 15, whereas the second layer 10 and the protective layer 14 are joined by surface interpenetration of the polymers achieved at the time of the coating. Finally, the substrate 16 and the detachment layer 17 are detached from the secure product 1.

The invention thus described offers, amongst others, the following advantage.

The secure products according to the invention enable to ensure readability by the naked eye or by a machine of readable information contained in the secure products, notably in the reading zone(s).

The invention has been described in particular exemplary embodiments illustrated by the different figures, which are not limiting. Additional embodiments may be envisaged by the person skilled in the art, such as, for example, the choice of materials, of techniques for depositing the different layers, and of the technique of forming the diffusing microstructure.

The invention claimed is:

1. A secure product comprising a first layer, a second layer and a third layer, the first layer being enclosed between the second and the third layers, wherein:
   the first and second layers are transparent,
   the first layer is reflective and at least partially reflects light incoming toward a side of the first layer that is in contact with the second layer,
   the third layer includes a plurality of zones comprising a photo zone and a machine-readable zone, the machine-readable zone including readable information,
   at least a first part of an interface between the first layer and the second layer comprises an optically diffusing microstructure,
   the optically diffusing microstructure is positioned so as to cover a predetermined part of the readable information,
   wherein a second part of the interface between the first layer and the second layer comprises an optically diffractive microstructure that forms at least one security element, and
   the readable information is readable by a machine through the first and second layers.

2. The secure product as claimed in claim 1, wherein the diffusing microstructure creates a refractive index gradient at the interface of the first and second layers.

3. The secure product as claimed in claim 1, wherein the third layer comprises paper.

4. The secure product as claimed in claim 1, wherein the first layer comprises at least one component chosen from zinc sulfide or titanium dioxide.

5. The secure product as claimed in claim 1, wherein the optically diffusing microstructure comprises a plurality of peaks and/or valleys positioned in a random manner.

6. The secure product as claimed in claim 5, wherein heights of the peaks and depths of the valleys are each between 50 and 200 nm.

7. The secure product as claimed in claim 1, wherein the first reflective layer and the second layer comprise different material.

8. The secure product as claimed in claim 1, wherein the first reflective layer has a refractive index greater than 2.

* * * * *